(12) United States Patent
Kim et al.

(10) Patent No.: US 6,870,824 B1
(45) Date of Patent: Mar. 22, 2005

(54) DEVICE AND METHOD OF DESIGNATING SPREADING CODE FOR FORWARD COMMON CHANNEL

(75) Inventors: Young-Ky Kim, Seoul (KR); Hi-Chan Moon, Seoul (KR); Sun-Mi Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/290,820

(22) Filed: Apr. 13, 1999

(30) Foreign Application Priority Data

Apr. 13, 1998 (KR) .............................................. 98-13151

(51) Int. Cl.$^7$ ................................................ H04B 7/216
(52) U.S. Cl. ...................... 370/342; 370/335; 370/348; 370/441
(58) Field of Search ................................ 370/342, 337, 370/335, 328, 320, 341, 442, 348, 441, 479; 455/575, 455, 434

(56) References Cited

U.S. PATENT DOCUMENTS

| | | | | |
|---|---|---|---|---|
| 5,581,547 A | * | 12/1996 | Umeda et al. | 370/342 |
| 5,737,327 A | * | 4/1998 | Ling et al. | 370/335 |
| 5,887,252 A | * | 3/1999 | Noneman | 370/312 |
| 5,930,366 A | * | 7/1999 | Jamal et al. | 370/509 |
| 5,946,356 A | * | 8/1999 | Felix et al. | 370/311 |
| 5,956,368 A | * | 9/1999 | Jamal et al. | 370/342 |
| 5,966,370 A | * | 10/1999 | Gunzelmann | 370/320 |
| 6,002,664 A | * | 12/1999 | Schachter | 370/207 |
| 6,011,787 A | * | 1/2000 | Nakano et al. | 370/335 |
| 6,078,572 A | * | 6/2000 | Tanno et al. | 370/335 |
| 6,091,717 A | * | 7/2000 | Honkasalo et al. | 370/329 |
| 6,104,709 A | * | 8/2000 | Rinchiuso et al. | 370/320 |
| 6,226,320 B1 | * | 5/2001 | Hakkinen et al. | 375/225 |
| 6,307,844 B1 | * | 10/2001 | Tsunehara et al. | 370/318 |
| 6,310,868 B2 | * | 10/2001 | Uebayashi et al. | 370/335 |
| 6,519,278 B1 | * | 2/2003 | Hiramatsu | 375/140 |
| 6,570,865 B2 | * | 5/2003 | Masui et al. | 370/342 |
| 6,614,771 B1 | * | 9/2003 | Kim et al. | 370/335 |
| 2002/0057659 A1 | * | 5/2002 | Ozluturk et al. | 370/335 |

* cited by examiner

Primary Examiner—Charles Appiah
(74) Attorney, Agent, or Firm—Dilworth & Barrese LLP (57) ABSTRACT

A CDMA communication system transmits packet data via a designated forward channel which uses a particular spreading code, in the case where a base station has the packet data to send to a mobile station while the mobile sation does not have a dedicated channel established. A base station includes a first channel transmitter for transmitting a control message including information representative of a spreading code for designating a specific forward common channel to a specific mobile station, to the mobile station via a forward common channel, and a second channel transmitter for spreading user data with the spreading code upon reception of a response to the control message and transmitting the spread user data. A mobile station includes a control message analyzer for analyzing a message including information representative of a designated spreading code received via a forward common channel, and a forward common channel receiver for despreading user data spread with the designated spreading code generated based on the information, using the spreading code.

24 Claims, 11 Drawing Sheets

DEVICE AND METHOD OF DESIGNATING SPREADING CODE FOR FORWARD COMMON CHANNEL

This application makes reference to, incorporates the same herein, and claims all benefits accruing under 35 U.S.C. §119 from an application entitled DATA COMMUNICATION DEVICE AND METHOD FOR CDMA COMMUNICATION SYSTEM earlier filed in the Korean Industrial Property Office on 13 Apr. 1998, and there duly assigned Serial No. 98-13151.

BACKGROUND OF THE INVENTION

1. Field of the Invention

The present invention relates generally to a communication device and method for a CDMA communication system, and in particular, to a data communication device and method for assigning a designated forward channel to send packet data to a mobile station.

2. Description of the Related Art

In general, CDMA (Code Division Multiple Access) communication services are classified into a circuit exchange service and a packet service. In the packet service, data is generated in a burst mode rather than continuously. Taking into consideration a radio resource capacity, a capability of a base station and a limited power consumption of a mobile station, the system need not continuously assign a dedicated traffic channel and a dedicated control channel to each user during the service. For this reason, a dedicated channel is temporarily assigned to the user when the burst traffic (or data) is generated, and is then released after transmission of the packet data, to thereby enable other users access to the limited channel resource.

FIGS. 1–4 illustrate various aspects of conventional packet data communication. The term "common channel" is used hereinbelow, with reference to FIGS. 1–4 to describe a channel which is used in common by several mobile stations both in reverse and forward links. For example, the common control channels include a forward paging channel, a forward common control channel, a reverse access channel and a reverse common control channel. In the third generation mobile communication radio transmission technology text, drafted by CDMA one group, forward common channel have forward pilot channel, synch channel, paging channel and forward common control channel. Reverse common channel have access channel and reverse common control channel.

Figure 1:
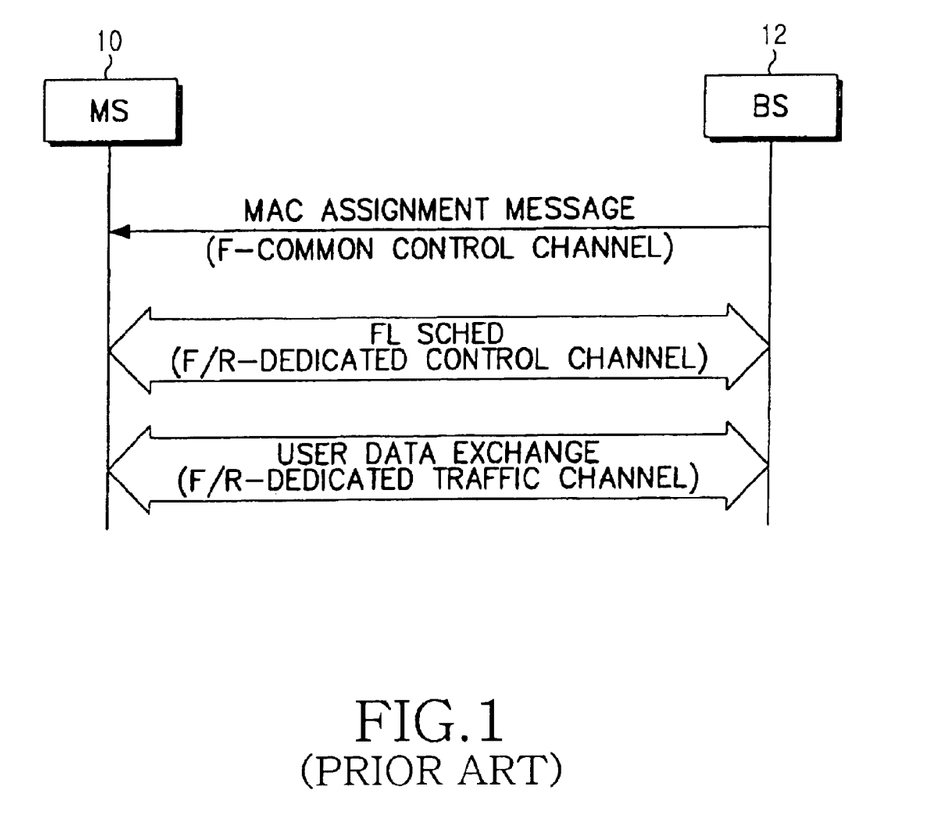
FIG. 1 is a diagram illustrating a procedure for establishing a dedicated channel when a mobile station is in a suspended state in a conventional CDMA communication system.
Figure 2:
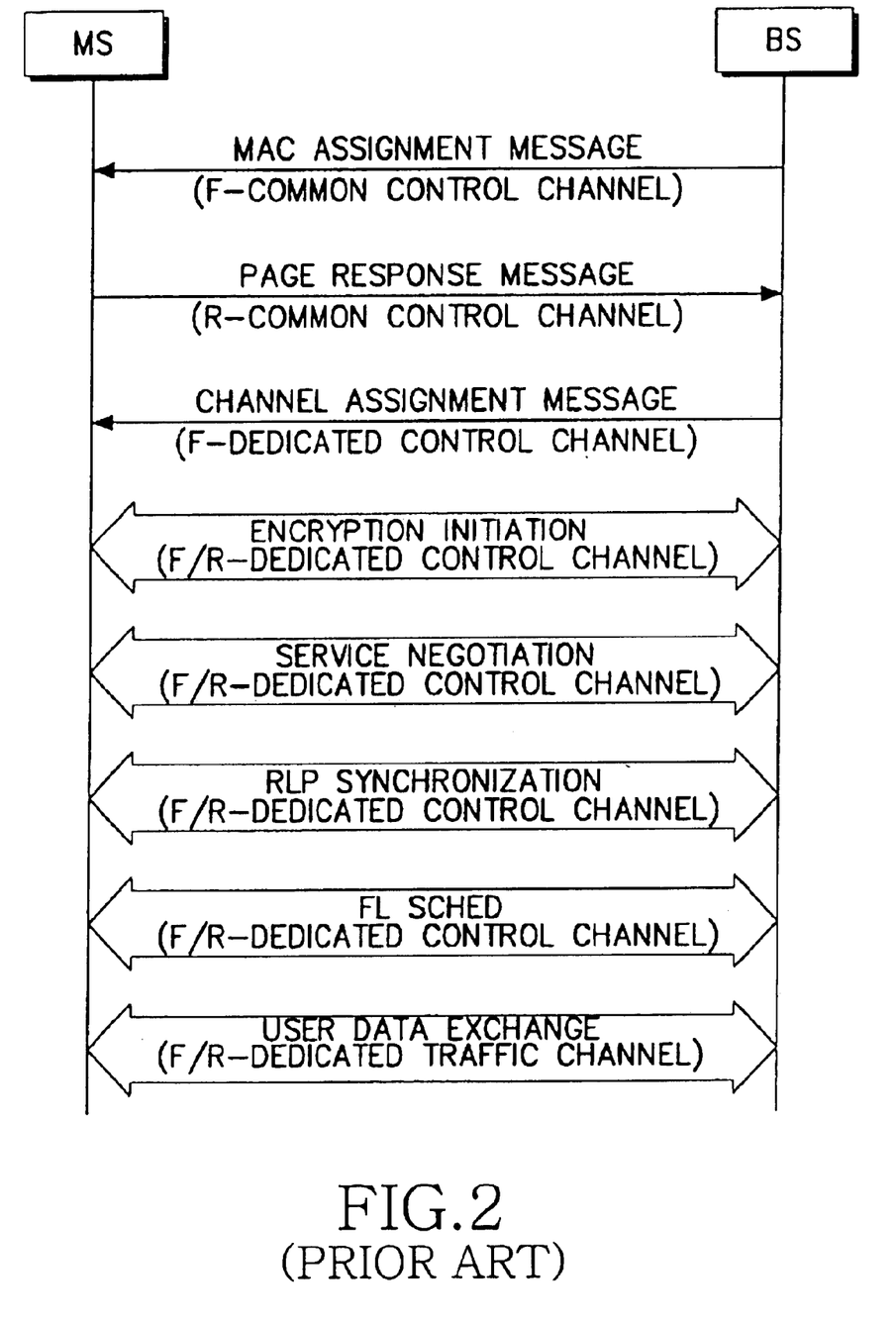
FIG. 2 is a diagram illustrating a procedure for establishing a dedicated channel when the mobile station is in a dormant state in a conventional CDMA communication system.

FIGS. 1 and 2 are diagrams illustrating conventional procedures for assigning a dedicated channel. FIG. 1 illustrates a procedure for assigning the dedicated channel when a mobile station (MS) is in a suspended state, and FIG. 2 illustrates a procedure for assigning the dedicated channel when the mobile station in a dormant state. When the data service has not been exchanging user data for some period, dedicated channels are released for other users. When user data is generated and needs to transmit to the mobile station, the base station has to reassign dedicated channels with exchanging control data on common control channels.

Referring to FIG. 1, for a mobile station in a suspended state, when there is packet data to transmit to the mobile station, the base station sends a resource allocation message via a forward common control channel. Upon receipt of the resource allocation message, the mobile station negotiates with the base station about assignment of dedicated traffic channels, via forward and reverse common channels. When the dedicated traffic channels are assigned according to the channel negotiation, the base station and the mobile station exchange user data via the assigned forward and reverse traffic channels.

Referring to FIG. 2, for a mobile station in a dormant state, when there is packet data to transmit to the mobile station, the base station sends a paging message via a forward common channel, and the mobile station then sends a response message in answer to the paging message via a reverse common channel. Upon receipt of the response message, the base station sends a channel assignment message via a forward dedicated control channel. Thereafter, the base station and the mobile station initiate encryption and perform service negotiation and RLP (Radio Link Protocol) synchronization, via the forward and reverse dedicated control channels. Subsequently, the base station and the mobile station perform forward link scheduling via the forward and reverse dedicated control channels, and exchanges user data via forward and reverse dedicated traffic channels assigned according to the service negotiation.

With reference to the channel assignment procedure described above, when dedicated traffic channels are re-assigned between the base station and the mobile station, latency and signaling overhead occur due to re-negotiation performed prior to exchange of the packet data. Here, the overhead which occurs in the process of assigning the dedicated traffic channels includes synchronization overhead for the RLP and signaling overhead pertinent to the service negotiation for re-connection of the packet service.

In addition to the aforementioned procedures, it is also possible to transmit the packet data using the common channel instead of the dedicated control channel. A method for transmitting the packet data using the common channel is illustrated in FIG. 3.

Figure 3:
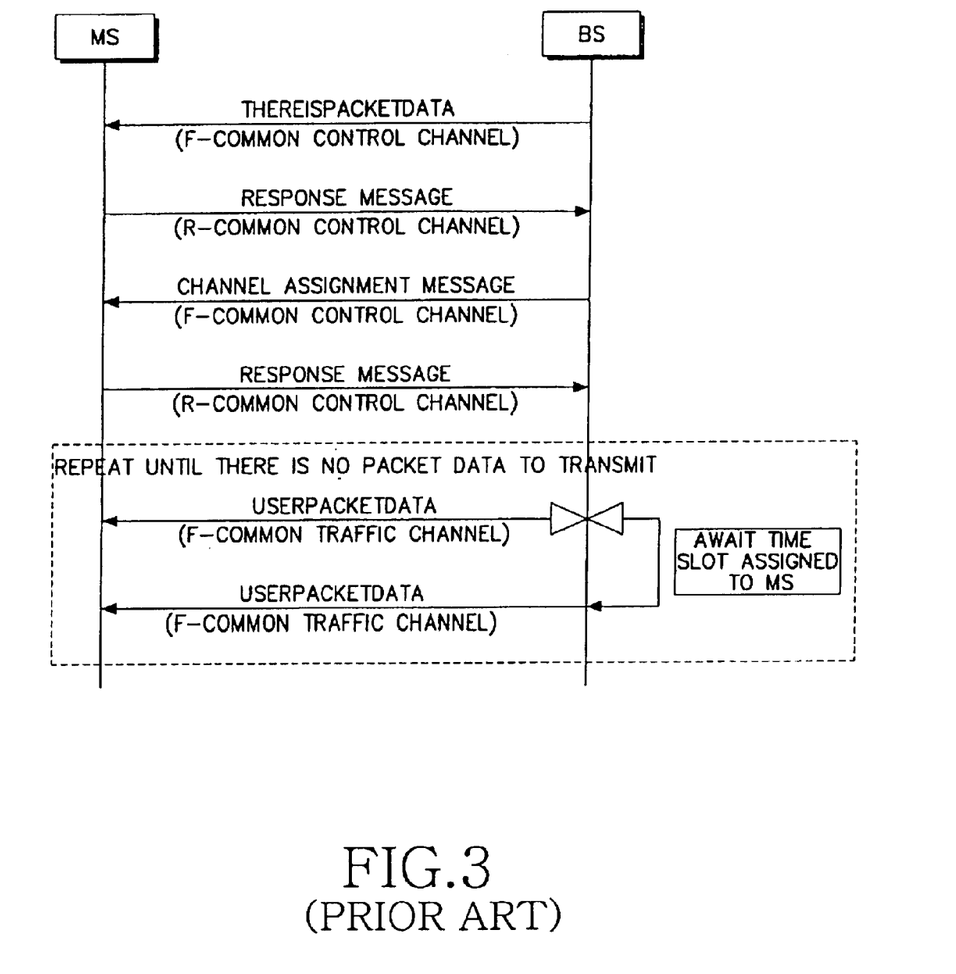
FIG. 3 is a diagram illustrating a procedure for transmitting packet data via a forward common channel in a conventional CDMA communication system.

Referring to FIG. 3, when there is packet data to transmit to the mobile station, the base station notifies the mobile station that there is packet data to transmit, via a forward common control channel. Upon receipt of the notice, the mobile station sends a response message via a reverse common control channel. Upon receipt of the response message, the base station assigns to the mobile station one of several time slots constituting a radio frame used for a common channel, and sends a corresponding channel assignment message via the forward common control channel. Upon receipt of the channel assignment message, the mobile station sends a response message via the reverse common control channel, and upon receipt of the response message, the base station repeatedly sends the packet data by loading it on a corresponding time slot of a common traffic channel until there is no more packet data to send.

In this case, the transmission time required for sending the packet data on a common channel, exclusive of the signaling overhead, can be defined as $$\text{Total Transmission Time} = (N/N_b) \times (T + T_0) \tag{1}$$

where:
N denotes the total number of data bits to be transmitted,
$N_b$: the number of data bits transmitted during one time slot,
$T_0$: a length of one time slot, and
T: is a time delay until next time slot.

That is, transmitting the packet data using the common channel causes an increased time delay as defined by equation (1) in addition to the signaling overhead due to channel assignment.

Figure 4:
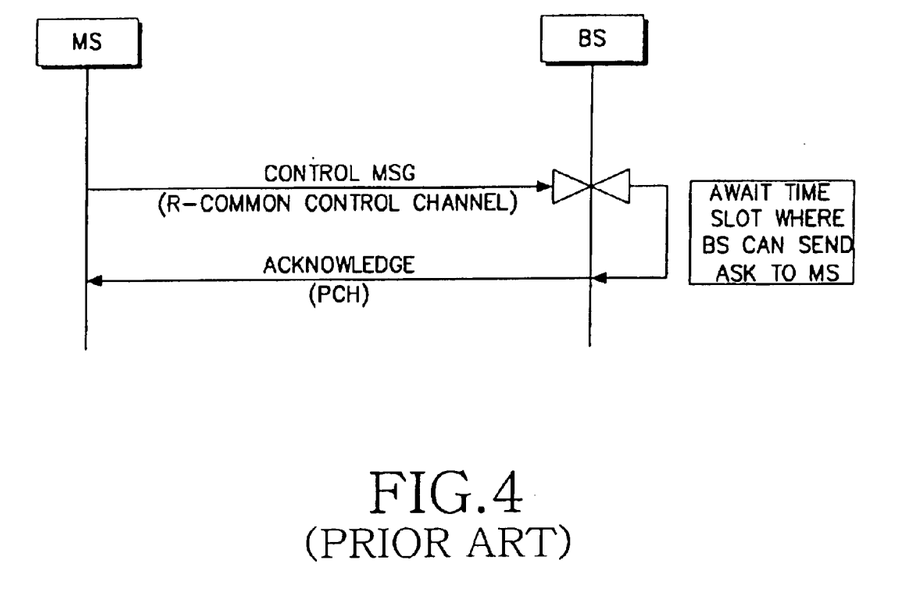
FIG. 4 is a diagram illustrating a procedure for receiving, at a mobile station, a response signal from the base station via a paging channel in a conventional CDMA communication system.

FIG. 4 is a diagram illustrating a conventional procedure in which the mobile station receives a response (or acknowledge) signal from the base station via a paging channel (PCH).

Referring to FIG. 4, the mobile station sends a control message requesting a response signal via a reverse common control channel. Upon receipt of the control message, the base station awaits a time slot assigned to the corresponding mobile station and then sends the acknowledge signal at the above time slot via the paging channel (PCH), thereby resulting in an undesirable time delay.

SUMMARY OF THE INVENTION

It is, therefore, an object of the present invention to provide a device and method for transmitting packet data to a mobile station, with no assigned dedicated channels, which overcomes the limitations associated with prior art transmission methods.

It is another object of the present invention to provide a device and method for designating forward spreading code for spreading forward common control message or short packet user data transmitted on a forward common channel.

In accordance with a particular aspect of the present invention, a device and method is provided which is capable of providing a channel identification code which is used to transmit packet data to a mobile station in lieu of assigning one of a dedicated traffic channel.

In accordance with another aspect of the present invention, when a mobile station must receive a response signal from a base station in a state where a dedicated channel is not established, the base station assigns a designated forward channel using a particular channel's code ID transmit to the mobile station and then sends the response signal using the assigned designated forward channel. In this invention, forward designated common channel means using specific spreading code for forward common channel identification in forward common channel. The BS selects one of a specific spreading code (i.e., an orthogonal code or long code) which is not used in other channels.

In a CDMA communication system according to the present invention, a base station includes a first channel transmitter for transmitting a control message including information representative of a spreading code for designating a specific forward common channel to a specific mobile station, to the mobile station via a forward common channel, and a second channel transmitter for spreading user data with said spreading code upon reception of a response to the control message and transmitting the spread user data. A mobile station includes a control message analyzer for analyzing a message including information representative of a designated spreading code received via a forward common channel, and a forward common channel receiver for despreading user data spread with the designated spreading code generated based on said information, using said spreading code.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well known functions or constructions are not described in detail since they would obscure the invention in unnecessary detail.

In the present invention, when there is packet data to transmit to a mobile station, a base station first checks a state of the mobile station to determine whether a dedicated traffic channel has been previously established. When the dedicated traffic channel has not been established, the base station analyzes features of the packet data and according to the analysis, establishes either a dedicated traffic channel or a designated forward channel. For example, when the packet data to transmit is small in quantity, the base station assigns the designated common channel; otherwise, when the packet data to transmit is large in quantity, the base station assigns the dedicated traffic channel, accepting the time delay and the signaling overhead with resignation. In other words, when there are Walsh codes not being used, the base station assigns one Walsh code ID for designating a forward common channel. However, if there are no Walsh codes available to assign for designation forward common channel, the base station selects one long code ID not being used and assigns the long code ID for designating forward common channel. A public long code mask ID which is generated from the ESN (electrical serial number) may be assigned as the long code ID for the designated forward channel. In this case, it is possible to accept the features of various packet data and most efficiently utilize the resources. Reference will be made hereinbelow to a method for transmitting the packet data using the designated forward channel.

Figure 5:
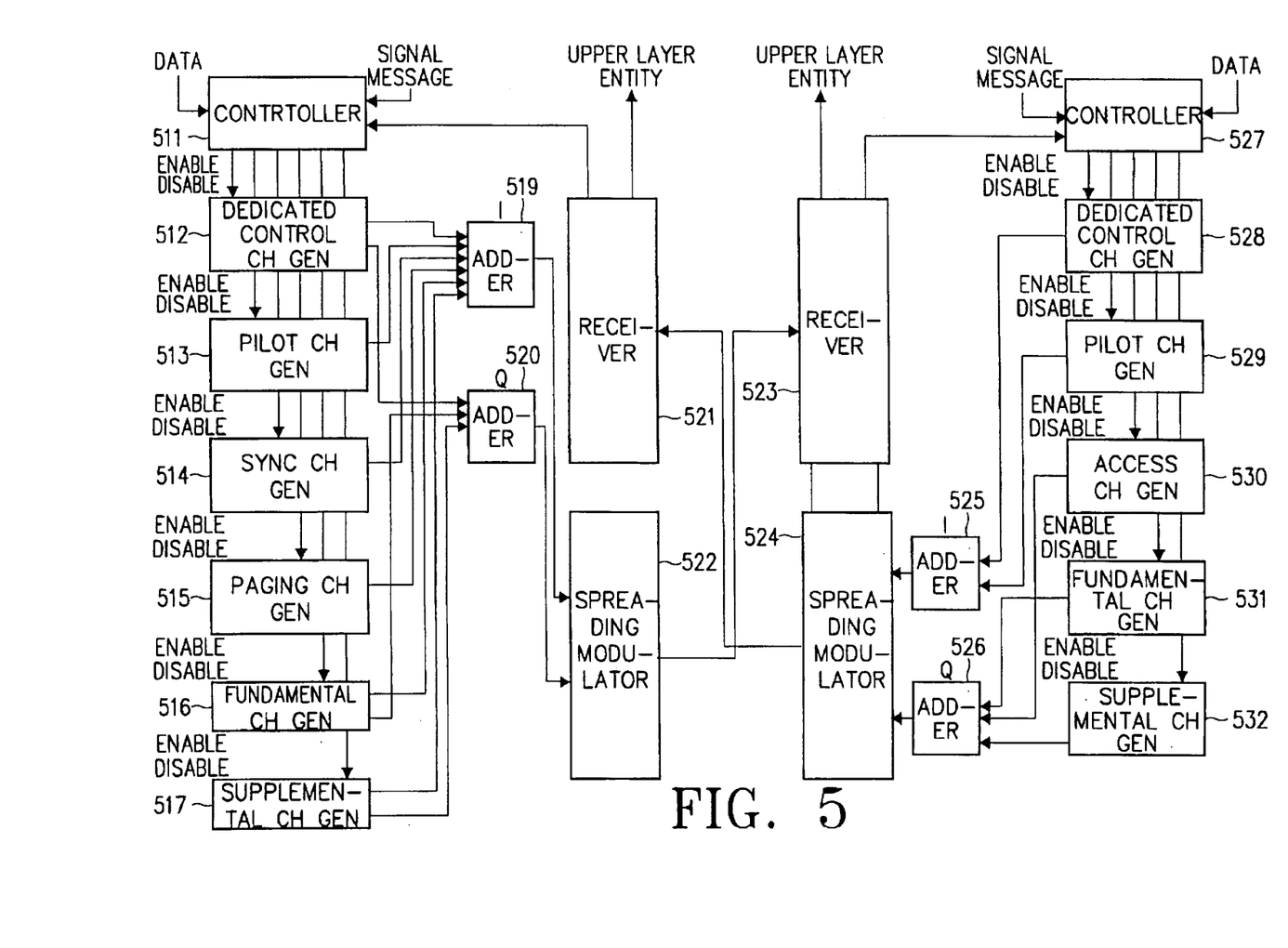
FIG. 5 is a block diagram of the channel structures and associated channel transmitter/receiver of a base station and mobile station in a CDMA communication system according to the present invention.

FIG. 5 illustrates respective channel structures of the base station and the mobile station and their channel transmitters/receivers in the CDMA communication system according to the present invention. In FIG. 5, the respective channel structures are illustrated focusing on the channel transmitters.

Base Station Channel Structure

First, a description will be provided as to the channel structures of the base station. A controller 511 enables/disables respective channel generators of the base station, processes messages in a physical layer being transmitted/received at the base station, and exchanges messages with an upper layer.

A pilot channel generator 513, a sync channel generator 514 and a paging channel generator 515 are devices for generating common channel information which is used in common by the users in the same cell or multiple cells. Further, a dedicated control channel generator 512, a fundamental channel generator 516 and a supplemental channel generator 517 are devices for generating user's dedicated channel information which is uniquely assigned to each user.

The dedicated control channel generator 512 processes various control messages on a forward dedicated control channel (F-DCCH) and transmits the processed control messages to the mobile station. The control messages transmitted via the forward dedicated control channel include various control messages used in an RLP frame or the IS-95B standard, and a MAC message having channel assignment and release information for the supplemental channel. In addition, when the fundamental channel is not in use, a power control signal can be transmitted via the dedicated control channel. In this case, the control message may include the power control signal. Moreover, through the forward dedicated control channel, the base station negotiates with the mobile station about a data rate of the supplemental channel. In the case where the supplemental channel uses an orthogonal code, the base station may also issue a command to change the orthogonal code via the forward dedicated control channel. The forward dedicated control channel is assigned and spread with an unused orthogonal code from among the orthogonal codes not assigned to the pilot channel generator 513, the sync channel generator 514 and the paging channel generator 515.

The pilot channel generator 513 transmits a forward pilot signal to the mobile station. The forward pilot channel transmits logic signals of all '0's or all '1's. In the embodiment, it is assumed that the forward pilot channel outputs the logic signals of all '0's. The signal on the pilot channel enables the mobile station to perform rapid acquisition and channel estimation for a new multipath. A predefined orthogonal code is assigned to the forward pilot channel to spread the pilot channel signal with the assigned orthogonal code.

A sync channel generator 514 processes information on the forward link sync channel and transmits the processed information to the mobile station. The information transmitted via the sync channel enables the mobile station in the same cell to perform initial time synchronization and frame synchronization. A predefined orthogonal code is assigned to the forward sync channel to spread the information on the forward sync channel with the assigned orthogonal code.

A paging channel generator 515 processes information on the forward link paging channel and transmits the processed information to the mobile station. The information transmitted via the paging channel includes all information required prior to call setup. A selected one of a predetermined number of orthogonal codes is assigned to the forward paging channel to spread the information on the forward paging channel.

The fundamental channel generator 516 processes information on the forward link fundamental channel and transmits the processed information to the mobile station. The information transmitted via the forward fundamental channel is basically a voice signal. Also, the information transmitted via the forward fundamental channel may include various control signals and the power control signal used in the IS-95B standard, as well as the voice signal. Furthermore, if necessary, the information transmitted via the forward link fundamental channel may include the RLP frame and the MAC message. The forward fundamental channel has a data rate of 9.6 Kbps or 14.4 Kbps, however, a variable rate can also be used according to the channel conditions, wherein the variable rate includes a ½ rate of 4.8 Kbps or 7.2 Kbps, a ¼ rate of 2.4 Kbps or 3.6 Kbps, and a ⅛ rate of 1.2 Kbps or 1.8 Kbps. It is necessary for the receiver to receive any variations which occur to the data rate. A unused orthogonal code from among the orthogonal codes not assigned to the pilot channel generator 513, the sync channel generator 514 and the paging channel generator 515 and other user traffic channel are assigned to the fundamental channel generator 516 for the forward link to spread the signal on the fundamental channel with the assigned orthogonal code.

A supplemental channel generator 517 processes information on the forward link supplemental channel and transmits the processed information to the mobile station. The information transmitted via the forward link supplemental channel includes the RLP frame and packet data. The supplemental channel generator 517 has a scheduled data rate of over 9.6 Kbps. Communicating at the scheduled data rate means that the base station communicates at a data rate determined by negotiating with the mobile station via the dedicated control channel. A unused orthogonal code from among the orthogonal codes not assigned to the pilot channel generator 513, the sync channel generator 514 and the paging channel generator 515 are assigned to the supplemental channel generator 517 for the forward link to spread the signal on the supplemental channel with the assigned orthogonal code. Here, the fundamental channel and the supplemental channel become traffic channels.

An adder 519 adds I-channel transmission signals output from the dedicated control channel generator 512, the fundamental channel generator 516 and the supplemental channel generator 517 and the transmission signals output from the pilot channel generator 513, the sync channel generator 514 and the paging channel generator 515.

An adder 520 adds Q-channel transmission signals output from the dedicated control channel generator 512, the fundamental channel generator 516, and the supplemental channel generator 517.

A spreading modulator 522 spreads the transmission signals output from the adders 519 and 520 by multiplying the output transmission signals by a spreading sequence, up-converts the spread signals to a radio frequency and transmits up-converted signals to the mobile station.

A receiver 521 receives respective channel signals transmitted from the mobile station via the reverse link, down-converts the received signals to a baseband frequency, and despreads the down-converted signals by multiplying them by a spreading sequence. In FIG. 5, the channel receiver structures for the reverse link, included in the base station, are not explicitly illustrated.

Mobile Station Channel Structure

Next, a description will be made as to the channel structures of the mobile station. A controller 527 enables/disables respective channel generators of the mobile station, processes messages in a physical layer being transmitted/received at the mobile station, and exchanges messages with an upper layer.

A dedicated control channel generator 528 processes various control messages on a reverse dedicated control channel (R-DCCH) and transmits the processed control messages to the base station. The control messages transmitted via the reverse dedicated control channel include various control messages used in the RLP frame or the IS-95B standard, and a MAC message having channel assignment and release information for the supplemental channel. The reverse dedicated control channel does not transmit the power control signal, since the power control signal is inserted into the pilot channel. Moreover, through the reverse dedicated control channel, the mobile station negotiates with the base station about a data rate of the supplemental channel. For channel separation, the dedicated control channel generator 528 for the reverse link spreads the dedicated control channel signal with an orthogonal code assigned to the dedicated control channel; for user classification, the dedicated control channel generator 528 spreads the dedicated control channel signal with a unique PN (Pseudo-random Noise) code assigned to the mobile station. That is, for channel separation (or division), different orthogonal codes are assigned to the dedicated control channel, the pilot channel, the access channel, the fundamental channel and the supplemental channel, respectively. Further, all the users have equal use of the orthogonal codes assigned to the respective channels. For example, all the users use the same orthogonal code for separating the dedicated control channel from other channels.

The dedicated control channel generator 528 for the reverse link has a fixed data rate of 9.6 Kbps. Compared with the prior art device which can transmit the control information of only 10 bits per 20 ms frame, the present embodiment can transmit the control information of over 168 bits per 20 ms frame or over 24 bits per 5 ms frame, thereby increasing the control efficiency. Since the data rate is fixed to 9.6 Kbps, the time delay due to rate determination does not occur and a rate decision circuit is not required, thus reducing the complexity of the receiver. In addition, since the dedicated control channel has the same data rate of 9.6 Kbps or 14.4 Kbps as the standard data rate of the voice signal, it is possible to maintain the same service area (or coverage) as that of the standard voice service.

A pilot channel generator 529 generating reverse link pilot and transmits the pilot signal to the base station. The pilot channel signal of the reverse link enables the base station to perform rapid acquisition and channel estimation for a new multipath, like the pilot channel signal of the forward link. In addition, the reverse pilot channel can transmit reverse power control information by adding a power control signal to the pilot signal being transmitted. In the reverse link, the power control signal is inserted in the pilot channel instead of being transmitted via a separate channel. Therefore, there is no necessity of assigning a separate channel for transmission of the power control signal. Preventing additional assignment of the separate channel reduces a peak-to-average ratio of the transmission signal, thereby increasing a coverage of the mobile station.

An access channel generator 530 processes information on the access channel for the reverse link and transmits the processed information to the base station. The signaling message on the access channel includes all information and control signal received by the base station prior to call setup.

A fundamental channel generator 531 processes information on the reverse link fundamental channel and transmits the processed information to the base station. The information transmitted via the reverse fundamental channel is basically a voice signal. Also, the information transmitted via the reverse fundamental channel may include various control signals used in the IS-95B standard, as well as the voice signal. Furthermore, if necessary, the information transmitted via the reverse link fundamental channel may include the RLP frame and the MAC message. In the reverse link, since the power control signal is transmitted via the pilot channel, the fundamental channel is not used for transmission of the power control signal. The reverse fundamental channel has a data rate of 9.6 Kbps or 14.4 Kbps, however, a variable data rate can be used according to the channel conditions, wherein the variable data rate includes a ½ rate of 4.8 Kbps or 7.2 Kbps, a ¼ rate of 2.4 Kbps or 3.6 Kbps, and a ⅛ rate of 1.2 Kbps or 1.8 Kbps. It is necessary for the receiver to receive such variations of the data rate. For channel separation, the fundamental channel generator 531 for the reverse link spreads the fundamental channel signal with an orthogonal code assigned to the fundamental channel; for user classification, the fundamental channel generator 531 spreads the fundamental channel signal with a unique PN code assigned to the mobile station. That is, for channel separation (or division), different orthogonal codes are assigned to the dedicated control channel, the pilot channel, the access channel, the fundamental channel and the supplemental channel, respectively. Further, all the users have equal use of the orthogonal codes assigned to the respective channels. For example, all the users use the same orthogonal code for separating the fundamental channel from other channels.

A supplemental channel generator 532 processes information on the reverse link supplemental channel and transmits the processed information to the base station. The information transmitted via the reverse link supplemental channel includes the RLP frame and packet data. The supplemental channel generator 532 has a scheduled data rate of over 9.6 Kbps. Communicating at the scheduled data rate means that the mobile station communicates at a data rate determined by negotiating with the base station via the dedicated control channel. For channel separation, the supplemental channel generator 532 for the reverse link spreads the supplemental channel signal with an orthogonal code assigned to the supplemental channel; for user classification, the supplemental channel generator 532 spreads the supplemental channel signal with the unique PN code assigned to the mobile station. Here, the fundamental channel and the supplemental channel become the traffic channel.

An adder 525 adds reverse link transmission signals output from the dedicated control channel generator 528 and the pilot channel generator 529. An adder 526 adds reverse link transmission signals output from the access channel generator 530, the fundamental channel generator 531 and the supplemental channel generator 532.

A spreading modulator 524 spreads the transmission signals output from the adders 525 and 526 by multiplying the output transmission signals by a spreading sequence, up-converts the spread signals to a radio frequency and transmits up-converted signals to the base station.

A receiver 523 receives respective channel signals transmitted from the base station via the forward link, down-converts the received signals to a baseband frequency, and despreads the down-converted signals by multiplying them by a spreading sequence. In FIG. 5, the channel receiver structures for the forward link, included in the mobile station, are not illustrated.

As illustrated in FIG. 5, the base station consists of the controller 511 for controlling the respective channels, the dedicated control channel generator 512, the pilot channel generator 513, the sync channel generator 514, the paging channel generator 515, the fundamental channel generator 516 and the supplemental channel generator 517, for processing the corresponding channel signals. Further, the mobile station consists of the controller 527, the dedicated control channel generator 528, the pilot channel generator 529, the access channel generator 530, the fundamental channel generator 531 and the supplemental channel generator 532. With respect to the output signals of the respective channel generators, the dedicated control channel generator 512, the fundamental channel generator 516 and the supplemental channel generator 517 in the base station divides the corresponding transmission signals into I (In-phase) channel components and Q (Quadrature-phase) channel components, respectively, whereas the pilot channel generator 513, the sync channel generator 514 and the paging channel generator 515 in the base station generate the I-channel signal.

Unlike the channel generators in the base station, the respective channel generators in the mobile station outputs I-channel signal and Q-channel signal. Accordingly, an output of the dedicated control channel generator 528 is added to an output of the pilot channel generator 529 and applied to an I-channel input of the spreading modulator 524 similarly outputs of the channel generators 530, 531 and 532 are added and applied to a Q-channel input of the spreading modulator 524. The access channel generator 530 generates output signals prior to the establishment of the traffic channels. Therefore, when using the access channel, the output of the pilot channel generator 529 is input to the I-channel and the output of the access channel generator 530 is input to the Q-channel.

A designated forward channel according to the present invention is a channel for spreading a signal on the forward common channel using a designated spreading code.

Figure 6:
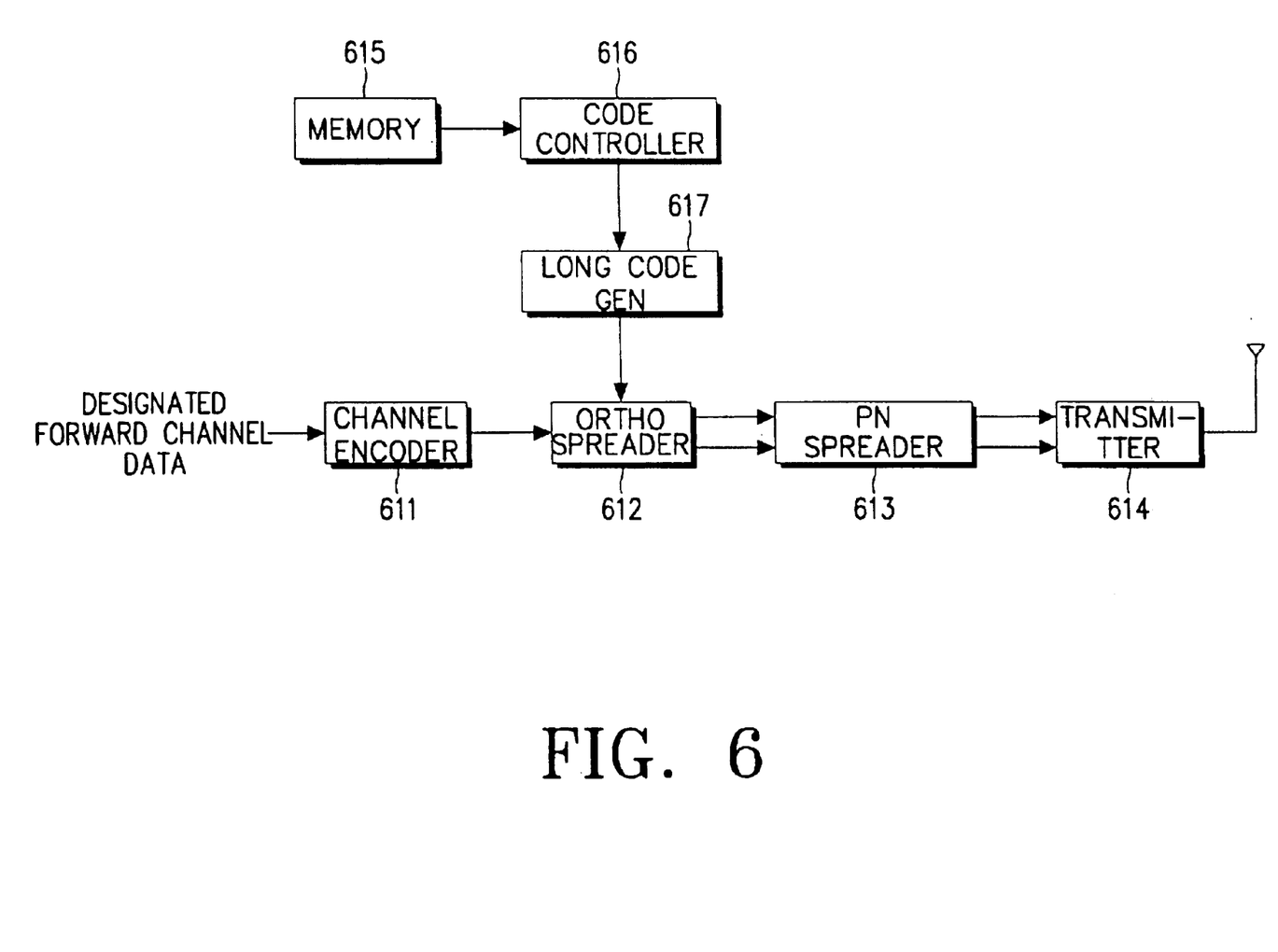
FIG. 6 is a block diagram illustrating a channel transmitter for assigning a designated channel using a Walsh code in the CDMA communication system according to an embodiment of the present invention.

FIG. 6 is a block diagram illustrating a channel transmission device for assigning a designated forward channel using a long code according to an embodiment of the present invention. This channel transmission device can be applied to the paging channel generator 515 and the forward common control channel generator of FIG. 5.

Referring to FIG. 6, a memory 615 stores an orthogonal code ID, and a code controller 616 determines a long code to be used presently and controls a long code generator 617 according to the determination. The long code generator 617, under the control of the code controller 616, generates a corresponding long code and provides the generated long code to an orthogonal spreader 612. Here, the generated long code may be one of the long codes used in common by several mobile stations or a unique public long code mask created using an electronic serial number (ESN) of the mobile station transmitted from the base station. In the case where the long code is one of the long codes used in common by several mobile stations, this long code, while it is in use, may not be assigned to any other designated forward channel. A channel encoder 611 receiving designated forward channel data, subjects the input data to encoding, repeating and interleaving. The orthogonal spreader 612 spreads data output from the channel encoder 611 by multiplying the data output from the channel encoder 611 by the long code output from the long code generator 617. A PN spreader 613 multiplies a signal output form the orthogonal spreader 612 by a PN code. A transmitter 614 up-converts a signal output from the PN spreader 613 to an RF signal.

In operation, when there is packet data to be transmitted via the designated forward common channel, the code controller 616 determines a long code to be used and controls the long code generator 617 according to the determination. The long code generator 617, under the control of the code controller 616, generates a corresponding long code and provides the generated long code as a first input to the orthogonal spreader 612. In addition, the channel encoder 611 encodes and interleaves the input packet data and outputs the packet data as a second input to the orthogonal spreader 612. The orthogonal spreader 612 then spreads the packet data output from the channel encoder 611 by multiplying the packet data by the long code provided from the long code generator 617. The spread designated forward channel signal output from the orthogonal spreader 612 is multiplied by the PN code in the PN spreader 613, thus being PN spread. The PN spread signal is up-converted to the RF signal at the transmitter 614 and then transmitted.

While FIG. 6 shows an example of assigning a designated forward channel using a specific long code, it is also possible to assign the designated forward channel using an orthogonal code instead of the long code. This is illustrated in FIG. 7.

Figure 7:
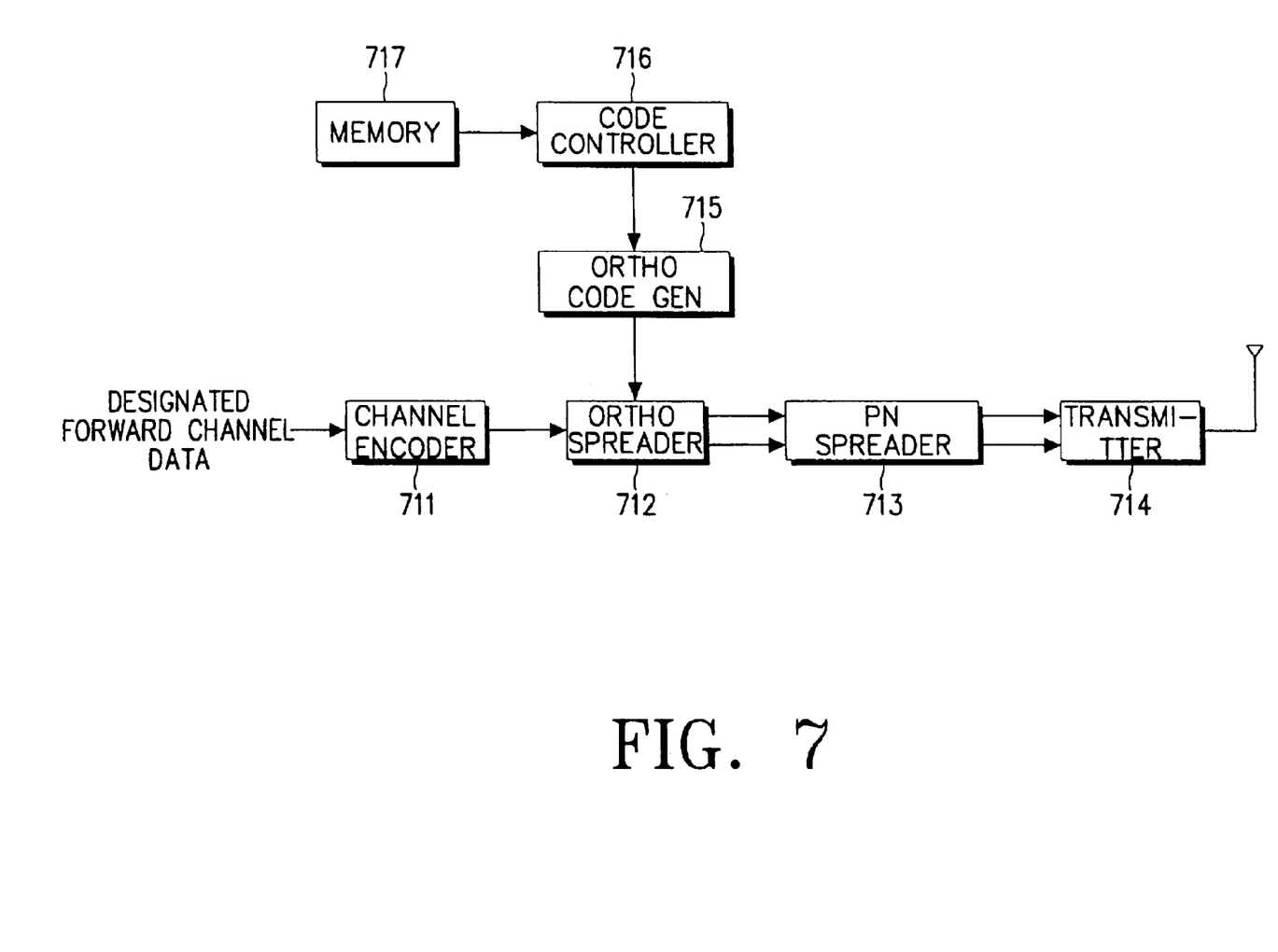
FIG. 7 is a block diagram illustrating a channel transmitter for assigning a designated channel using a long code in the CDMA communication system according to another embodiment of the present invention.

Referring to FIG. 7, when there is packet data to be transmitted via the designated channel, a code controller 716 determines an orthogonal code to be used and controls an orthogonal code generator 715 according to the determination. The orthogonal code generator 715, under the control of the code controller 716, generates a corresponding orthogonal code and provides the generated orthogonal code to an orthogonal spreader 712. Meanwhile, a channel encoder 711 encodes and interleaves the input packet data and outputs the packet data to the orthogonal spreader 712. The orthogonal spreader 712 then spreads the packet data output from the channel encoder 711 by multiplying the packet data by the orthogonal code provided from the orthogonal code generator 715. The signal output from the orthogonal spreader 712 is multiplied by a PN code in a PN spreader 713, thus being PN spread. The PN spread signal is up-converted to the RF signal at a transmitter 714 and then transmitted. The main difference from the dedicated channel, the packet data is generated by common channel signal structure but spreading code is orthogonal code.

Figure 8:
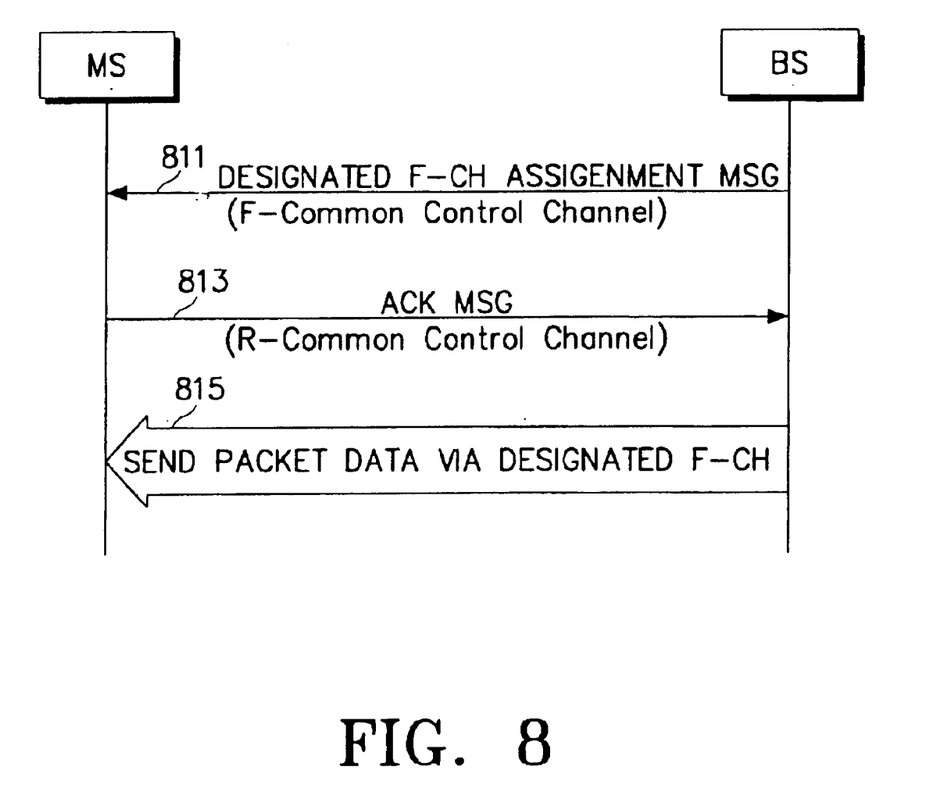
FIG. 8 is a diagram illustrating a procedure for transmitting packet data via a designated forward channel in the CDMA communication system according to the present invention.

Having described the assignment of a designated forward common channel using one of a long code or orthogonal code, FIG. 8 is a message flow diagram illustrating a procedure for transmitting packet data via a designated forward channel in the CDMA communication system according to the present invention.

Referring to FIG. 8, when there is packet data to transmit to the mobile station, the base station sends a designated forward channel assignment message (which is a kind of control message) via a forward common channel, in step 811. Here, the designated forward channel assignment message includes a specified field for a channel ID. The channel ID is a code ID that the base station has assigned for the designated forward channel; with use of this channel ID, the mobile station generates a code for receiving packet data. Upon receipt of the designated forward channel assignment message, the mobile station stores the channel ID included in the received message, prepares for reception of the packet data transmitted via the designated forward channel and thereafter, sends a response message via a reverse common control channel, in step 813. Upon receiving the response message, the base station sends, in step 815, the packet data via the designated forward channel. Here, since the designated forward channel secures a point-to-point connection between the base station and the mobile station, the time delay can reduce the re-setup dedicated channel and transmitting the packet data, and the connection is maintained until there is no more packet data to transmit. In the meantime, when there is no more packet data to transmit, the base station and the mobile station release the designated forward channel. Here, as described above, the designated forward common channel is assigned using the long code or the orthogonal code.

In addition, for the designated forward channel, a data transmission time is given by $$\text{Total Transmission Time } (N/N_b) \times T_0 \qquad (2)$$

where N denotes the total number of data bits to be transmitted, $N_b$ the number of data bits transmitted for one time slot, and $T_0$ a length of one time slot.

In comparison with equation (1), it is noted that the transmission delay time is much lower than the case where the existing common channel is used. As described by Equation 2, there is no time delay associated with assigning the next available time slot to the mobile station.

For a detailed description of the procedure shown in FIG. 8, reference will now be made to the signaling procedures of the base station and the mobile station with reference to FIGS. 9 and 10, respectively.

Figure 9:
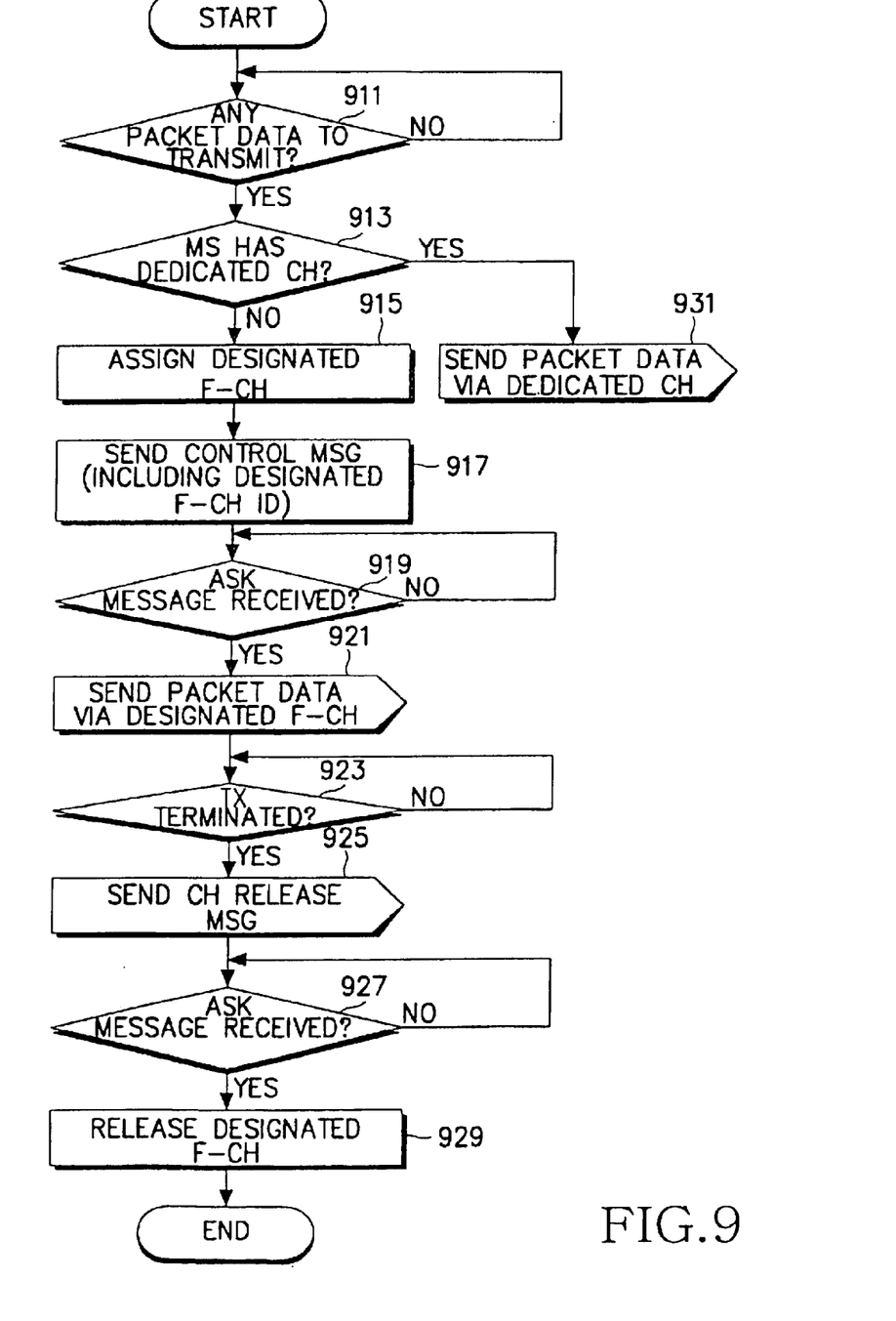
FIG. 9 is a flow chart illustrating how the base station transmits the packet data via the designated forward channel in the CDMA communication system according to the present invention.

FIG. 9 is a diagram illustrating a control procedure for using a forward designated channel instead of a forward common channel, when there is no dedicated traffic channel and packet data must be transmitted to a mobile station. The base station notifies the mobile station that some packet data will be transmitted to the mobile station via a forward designated station by sending a Designated Forward Channel Assignment Message including the code ID of the base station.

Referring to FIG. 9, the base station determines in step 91 1 whether there is packet data to transmit to the mobile station. When there is no packet data to transmit to the mobile station, the base station continues to check whether there is packet data to transmit. Otherwise, when there is packet data to transmit to the mobile station, the base station examines in step 913 whether there is any forward dedicated traffic channel established to transmit the packet data. When there is a forward dedicated traffic channel established, the base station sends the packet data via the dedicated traffic channel being presently established, in step 931. However, when there is no forward dedicated traffic channel established, the base station assigns a designated forward channel using a specified code, in step 915. Here, the specified code can be an orthogonal code or a long code. Here, the long code may be a designated one of the presently not used long codes prepared for the designation or a unique long code generated using the ESN of the mobile station. After assignment of the designated forward channel, the base station sends a channel assignment message for assigning the designated forward channel to the mobile station in step 917, and determines in step 919 whether a response message is received from the mobile station in answer to the channel assignment message. Upon reception of the response message from the mobile station, the base station proceeds to step 921; otherwise, the base station awaits the response message for a predetermined time. In step 921, the base station sends the packet data via the assigned designated forward common channel, and determines in step 923 whether transmission of the packet data is completed. When transmission of the packet data is completed, the base station sends the mobile station a channel release message for releasing the designated forward channel in step 925, and determines in step 927 whether a response message is received from the mobile station in answer to the channel release message. Upon receipt of the response message, the base station releases the designated forward channel in step 929. When the response message is not received, the base station awaits the response message for a predetermined time.

Figure 10:
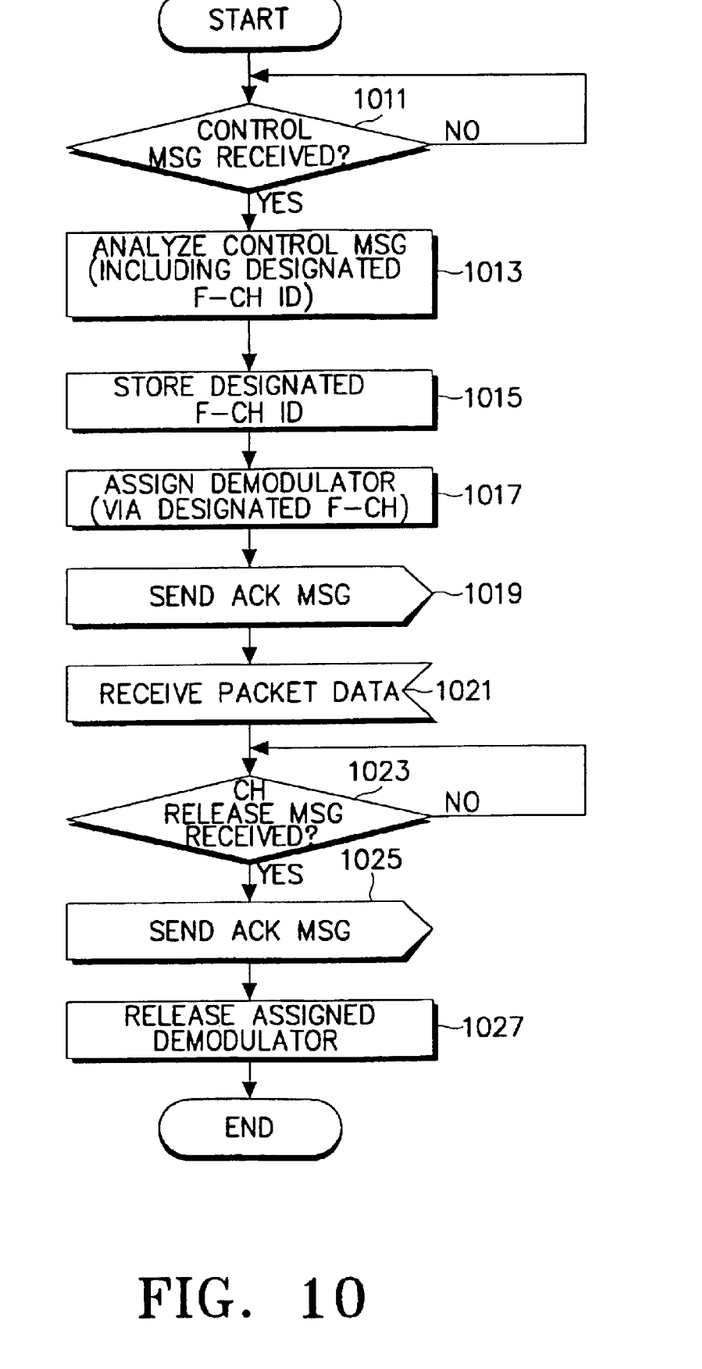
FIG. 10 is a flow chart illustrating how the mobile station receives the packet data via the designated forward channel in the CDMA communication system according to the present invention.

FIG. 10 is a diagram illustrating a control procedure of the mobile station. Referring to FIG. 10, the mobile station determines in step 1011 whether a control message including a specified channel ID is received from the base station. In other words, the base station determines whether the channel assignment message for assigning the designated forward channel is received or not. Upon receipt of the control message, the mobile station analyzes in step 1013 the received control message, and extracts in step 1015 the channel ID from the control message and stores the extracted channel ID in the memory. The channel ID is a specified code ID representing a specified orthogonal code or long code. In addition, the long code can be a specified one of the long codes prepared for the designation, or a unique long code generated using ESN of the mobile station. After storing the channel ID for the designated forward channel, the mobile station assigns in step 1017 a demodulator for receiving the packet data through the designated forward common channel corresponding to the channel ID, and sends in step 1019 an ACK (or response) message to the base station in response to the control message. Thereafter, the mobile station receives the packet data transmitted from the base station, in step 1021. After reception of the packet data is completed, the mobile station determines in step 1023 whether a channel release message is received from the base station. Upon reception of the channel release message, the mobile station sends in step 1025 an ACK message to the base station in response to the channel release message, and then releases the assigned demodulator in step 1027.

Heretofore, the present invention has been described with reference to an embodiment in which the base station assigns the designated forward common channel by one-time communication in order to transmit the packet data to the mobile station via the designated forward channel with the reduced signaling overhead and time delay. However, it is also possible that the mobile station requests the designated forward channel. This method can be used when the mobile station needs to urgently receive an ACK message from the base station after sending a control message via a reverse common channel. In this case, the mobile station can rapidly receive the ACK message from the base station with the reduced time delay, as compared with the case where the mobile station awaits a time slot, assigned to itself, of the forward common channel and then receives the ACK message at the time slot.

Figure 11:
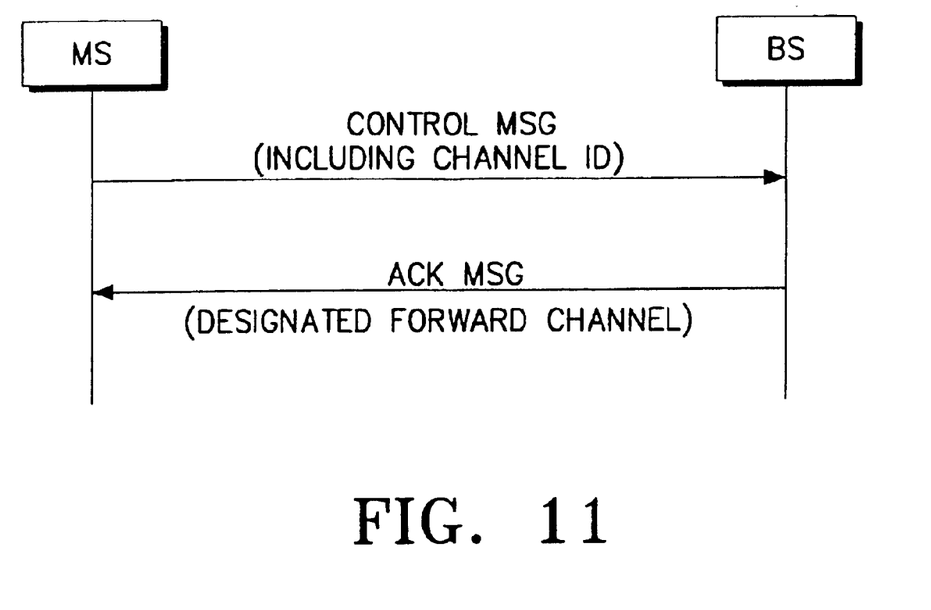
FIG. 11 is a diagram illustrating a procedure in which the mobile station receives a response signal via the designated forward channel in the CDMA communication according to the present invention.

Now, referring to FIG. 11, a description will be made as to a procedure in which the mobile station sends a designated forward channel assignment request message to the base station in the case where the mobile station needs to urgently receive an ACK message from the base station.

First, when it is required to receive an immediate ACK message from the base station in response to a control message transmitted via the reverse common channel, the mobile station sends a specific channel ID together with the control message. The base station then assigns a designated forward channel using the received channel ID and sends an ACK message. Here, the specific channel ID is a long code ID; upon reception of the control message carrying the channel ID from the mobile station, the base station immediately sends the ACK message via the designated forward channel distinguished by the long code ID as shown in FIG. 6. In addition, it is also possible that the mobile station sends the control message together with the ESN of the mobile station instead of the long code ID. The base station then generates a unique long code using the received ESN of the mobile station and assigns a designated forward channel using the generated unique long code to send the ACK message to the mobile station. In this manner, it is possible to reduce the signaling overhead and the transmission time delay occurring in the existing system where the base station assigns a specific time slot to send the ACK message.

As described above, in the case where the base station has packet data to transmit to the mobile station in a state where the mobile station has no dedicated traffic channel assigned to itself, the base station sends the packet data using a designated forward channel. In this manner, it is possible to prevent the time delay and signaling overhead required for the dedicated traffic channel and reduce the transmission time required when using the common channel. Moreover, even in the case where the mobile station requires an urgent ACK message from the base station, the base station can more quickly send the ACK message via the designated forward channel, as compared with the case where the common channel is used.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station communication device for a code division multiple access (CDMA) communication system, comprising:
   a first channel transmitter for transmitting a control message including information representative of a spreading code for designating a specific forward common channel for a specific mobile station, to said mobile station via a forward common channel; and
   a second channel transmitter for spreading user data with said spreading code upon reception of a response to the control message and transmitting the spread user data via said specific forward common channel.

2. The base station communication device as claimed in claim 1, wherein the information representative of the spreading code is a specific long code mask ID.

3. The base station communication device as claimed in claim 2, wherein the information representative of the spreading code is a public long code mask generated using an electronic serial number (ESN) of the mobile station.

4. The base station communication device as claimed in claim 1, wherein the information representative of the spreading code is a specific orthogonal code ID.

5. The base station communication device as claimed in claim 1, wherein the user data is transmitted via a paging channel.

6. The base station communication device as claimed in claim 1, wherein the user data is transmitted via a forward common control channel.

7. The base station communication device as claimed in claim 1, further comprising:
   a control message analyzer for analyzing designated channel request information included in a control message received via the reverse common channel; and
   said first channel transmitter for transmitting, in response to the control message, a control message including information representative of a spreading code for designating a specific forward common channel to the mobile station, to said mobile station via the forward common channel.

8. The base station communication device of claim 1, wherein the first channel transmitter assigns said spreading code for designating said specific forward common channel for said specific mobile station.

9. A mobile station communication device for a CDMA communication system, comprising:
   a control message analyzer for analyzing a message including information representative of a designated spreading code received via a forward common channel; and
   a forward common channel receiver for receiving data via a forward common channel specified by a base station, and despreading user data spread with the designated spreading code generated based on said information, using said spreading code.

10. The mobile station communication device as claimed in claim 9, wherein the information representative of the spreading code is information by which a mobile station exclusively receives the user data transmitted from a base station via the forward common channel.

11. The mobile station communication device as claimed in claim 10, wherein the information representative of the spreading code is a specific long code ID.

12. The mobile station communication device as claimed in claim 11, wherein the information representative of the spreading code is a public long code mask created using an ESN of the mobile station.

13. The mobile station communication device as claimed in claim 10, wherein the information representative of the spreading code is a specific orthogonal code ID which is not currently used by other channel.

14. The mobile station communication device as claimed in claim 10, wherein the information representative of the spreading code is a quasi orthogonal code ID which is not currently used by other channel.

15. A mobile station communication device for a CDMA communication system, comprising:
   a reverse common channel transmitter for transmitting a message requesting a designated spreading code to be used for a forward common channel;
   a forward common channel receiver for receiving via a forward common channel specified by a base station a message including information representative of the designated spreading code in response to the request message; and
   a forward common channel receiver for despreading a forward common channel message spread with the designated spreading code, using the designated spreading code.

16. A communication method of a base station in a CDMA communication system, comprising:
   transmitting a control message including information representative of a spreading code for designating a specific forward common channel to a specific mobile station, to said mobile station via a forward common channel; and
   spreading user data with said spreading code upon reception of a response to the control message and transmitting the spread user data via said specific forward common channel.

17. The communication method as claimed in claim 16, wherein the information representative of the spreading code is a specific long code mask ID.

18. The communication method as claimed in claim 17, wherein the information representative of the spreading code is a public long code mask created using an electronic serial number (ESN) of the mobile station.

19. The communication method as claimed in claim 16, wherein the information representative of the spreading code is a specific orthogonal code ID.

20. The communication method as claimed in claim 16, wherein the user data is transmitted via a paging channel.

21. The communication method as claimed in claim 16, wherein the user data is transmitted via a forward common control channel.

22. The communication method as claimed in claim 16, further comprising:

analyzing designated channel request information included in a control message received via the reverse common channel; and transmitting, in response to the control message, a control message including information representative of a spreading code for designating a specific forward common channel to the mobile station, to said mobile station via the forward common channel.

23. The communication method as claimed in claim 16, wherein the information representative of the spreading code is a quasi orthogonal code ID which is not currently used by other channel.

24. A communication method of a mobile station in a CDMA communication system, comprising:

transmitting a message requesting a designated spreading code to be used for a forward common channel;

receiving via a forward common channel specified by a base station a message including information representative of the designated spreading code in response to the request message; and despreading a forward common channel message spread with the designated spreading code, using the designated spreading code.

* * * * *